United States Patent Office 3,267,498
Patented August 23, 1966

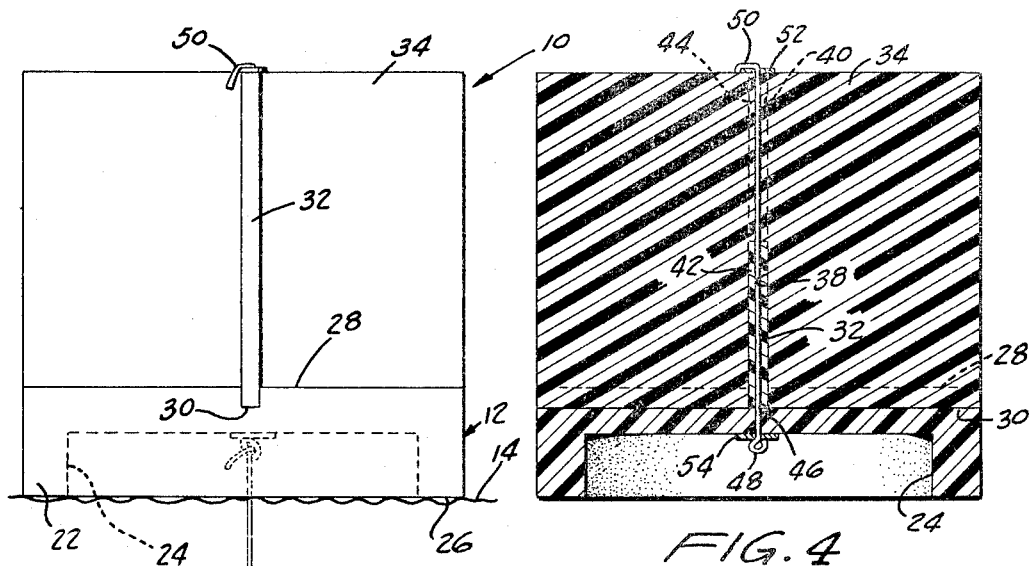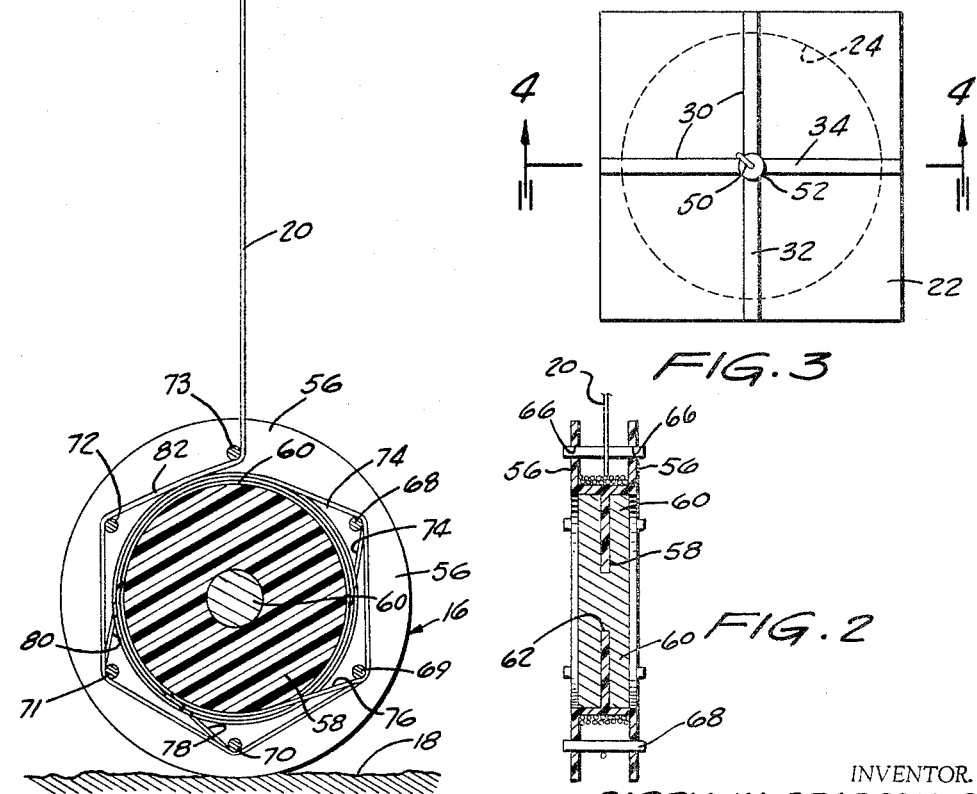

3,267,498
MARKING DEVICE
Parry W. Pearson, Jr., Rte. 3, Alpena, Mich.
Filed Sept. 14, 1964, Ser. No. 396,145
1 Claim. (Cl. 9—8)

This invention relates generally to marking devices and more particularly to an improved float and sinker assembly for marking a desired spot on a body of water, for example, for the purpose of marking a fishing spot.

It is often desired to mark a spot, on a body of water such as a lake, so that a later return can be made to the identical spot. This circumstance arises most often in the case of fishermen when they have located a spot on a lake where fish can be caught. Such a device is also desirable in the case of ocean work where it is desired to mark a spot, for example, where something such as a sunken vessel may be positioned. In all such cases, an accurate marking is completely dependent on the length of the line between the sinker and the float or buoy being approximately equal to the depth of the water at the spot being marked. If the line is too short, the float is free to drift, and if the line is too long the float is free to travel a wide range and its position does not give a true indication of the desired mark. A quick adjustment of the length of the line between the float and the sinker to correspond to the depth of the water at a given spot is desirable in order to adapt the device to various situations. Furthermore, if such a marking device is to be generally useful, it must be capable of compact storage such as in a fishing tackle box, when not being used. It is an object of this invention, therefore, to provide an improved marking device consisting of a float and sinker assembly in which the sinker assembly is readily adjusted to play out a predetermined length of line corresponding to the depth of the water during the time the sinker assembly is sinking toward the bottom of the body of water.

A further object of this invention is to provide an improved sinker assembly having provision for winding a length of line onto it, and removable pins which determine the length of line played out from the sinker at any one time.

Still another object of this invention is to provide a knockdown float assembly which can be conveniently and compactly stored with the sinker device of this invention.

Further objects, features and advantages of this invention will become apparent from a consideration of the following description, the appended claim, and the accompanying drawing in which:

FIGURE 1 is a side view of the marking device of this invention, illustrating the float floating on the surface of the water and illustrating the sinker attached thereto resting on the bottom of the lake;

FIGURE 2 is a transverse sectional view through the sinker shown in FIG. 1;

FIGURE 3 is a reduced top view of the float shown in FIG. 1; and

FIGURE 4 is a vertical sectional view of the float shown in FIG. 1, as seen from substantially the line 4—4 in FIG. 3.

With reference to the drawing, the marking device of this invention, indicated generally at 10, is illustrated in FIG. 1 as consisting of a float, illustrated floating on a water surface 14, a sinker 16 shown resting on the bottom 18 of the body of water on which the float 12 is floating, and a line 20 attached to and extending between the float 12 and the sinker 16. The float shown in FIGS. 1, 3 and 4 consists of a base 22 having a cylindrical cavity 24 formed in its bottom side 26. The cavity 24 is of a shape such that the sinker 16 can be stored therein during storage of the device 10.

The top side 28 of the base 22 is formed with a pair of intersecting channels or grooves 30 and a pair of upright vanes 32 and 34 are supported in the grooves 30. The vane 34 is formed with a slot 38 at its lower end and the vane 32 is formed at its top end with a similar slot 40. As a result, the vanes 32 and 34 can be arranged in an interfitted arrangement in which they intersect each other at right angles as shown in FIG. 3. When so arranged a portion 42 of the vane 32 is disposed in the slot 38 in the vane 34 and is vertically aligned with a portion 44 of the vane 34 which is disposed in the slot 40 in vane 32. An elongated pin 46, having an eye 48 at its lower end, is extended upwardly through the aligned vane portions 42 and 44 and has its upper end portion 50 bent over a washer 52 so as to lock the vanes 32 and 34 together and lock them onto the base 22. A washer 54 is also positioned between the eye 48 and the base 22 to prevent the pin 46 from pulling through the base 22 and the vanes 32 and 34.

It can thus be seen that the vanes 32 and 34 which are essentially flat rectangular members, can be readily disassembled, by removing the pin 46, so that they can be stacked flat on the base 22 for storage purposes. The float 12 can be formed of any low cost relatively buoyant material and is preferably formed from a material such as foamed plastic.

When it is desired to use the float 10, it is assembled as shown in FIGS. 1, 3 and 4 and the upper end of the line 20 is secured to the eye 48 on the pin 46. The opposite end of the line 20 is secured to the sinker 16 in the novel manner hereinafter described.

The sinker 16 consists of a pair of flat annular discs 56 which are formed integral with and disposed radially outwardly of a central spool or arbor 58. The discs 56 and the arbor 58 can be formed of any low cost material and are illustrated as being formed of plastic. A lead body 60, interlocked with the arbor 58 by extending the body 60 through an opening 62 in the arbor, insures that the sinker 16 will sink in water.

The discs 56 are formed with a plurality of openings 66, illustrated as six in number, and the openings 66 for one disc 56 are aligned with the openings 66 in the other disc 56. Pins 68, 69, 70, 71, 72 and 73, corresponding in number to the number of openings 66 in a disc 56, are inserted through the aligned openings 66 and are of a size to be frictionally retained in the openings 66.

The line 20 is secured at its lower end to the arbor 58, such as by tying the line 20 to the arbor 58 before any of the pins 68–73, inclusive, have been mounted on the discs 56. The pin 68 is then mounted on the discs 56 and a predetermined length of the line 20 is wound in a path extending about the arbor 58 and the pin 68 as indicated at 74. The number of times the line 20 is wound about this path is dependent on the length of the line 20 which it is desired to have in this position. The pin 69 is then inserted and the line 20 is wound in a path extending about the arbor 58, then the pin 68, then around the pin 69 and then around the arbor 58 as indicated at 76 until another predetermined length of the line has been wound on sinker 16. The winding of line 20 is continued until another predetermined length of the line 20 is wound in a path extending about the arbor 58, the pin 68, the pin 69 and the pin 70 and then back onto the arbor 58, as shown at 78. Another predetermined length of the line 20 is then wound in a path extending about the arbor 58, the pins 68, 69 70 and 71 and then back on the arbor 58 as indicated at 80. The next predetermined length of the line 20 is then wound about the arbor 58, the pins 68, 69, 70, 71 and 72 and then back onto the arbor 58, as shown at 82, inside the pin 73.

With the line 20 wound about the sinker 16 as described above, which is readily accomplished since it is only necessary to continue winding the line and progressively insert the pins 68, 69, 70, 71, 72 and 73, the sinker 16 can be readily dropped into the water so that a predetermined length of line will unwind therefrom. In other words, the deeper the water at the spot to be marked, the greater the number of pins that are removed from the sinker 16 prior to dropping it in the water. In removing the pins, they are always removed in the order opposite to the order in which they were installed. Consequently, the pins are always removed starting with pin 73 and ending with pin 68.

As an example, assume that there is ten feet of line 20 between the pin eye 48 and the pin 73. Further assume, that two feet of line 20 is wound onto the sinker 16 before each of the pins 68–73, inclusive, is installed. If the water is sixteen feet deep at the spot to be marked, the pins 73, 72 and 71 are quickly removed and the float 12 and the sinker 16 are thrown overboard. As the sinker 16 sinks, six feet of line 20 will unwind from the sinker 16 so that a total of sixteen feet of line will extend between the sinker 16 and the float 12. If the water is eighteen feet deep, the pins 73, 72, 71 and 70 are removed prior to putting sinker 16 in the water.

From the above description it is seen that this invention provides a marking device which is preset so that by removing a quickly calculatable number of the pins 68–73, inclusive, a length of line corresponding to the depth of the water can readily be provided between the sinker 16 and the float 12. As a result, the device 10 is readily adapted to marking a fishing spot, and the device 10 can readily be made in larger sizes for marking spots in an ocean. It is not necessary to use the float 12 with the sinker 16, it being apparent that any float, such as a balloon or a plastic bottle can be substituted for the float 12. The advantage of the float 12 is that it is readily disassembled into a knockdown condition in which it is capable of compact storage with the sinker 16 positioned in cavity 24. This is of particular advantage in the case of fishermen. When float 12 is assembled the vanes 34, which are preferably brightly colored, project upwardly from water surface 14 so as to be clearly visible.

It will be understood that the marking device which is herein disclosed and described is presented for purposes of explanation and illustration and is not intended to indicate limits of the invention, the scope of which is defined by the following claim.

What is claimed is:

In a marking device, a float, a line having a pair of ends one of which is secured to said float, a sinker secured to the other end of said line, said sinker comprising a weighted, spool, a pair of axially spaced discs secured to opposite sides of said spool, said discs having portions thereof located radially outwardly of said spool, said disc portions having a plurality of axially aligned openings formed therein and located so that the openings in each disc are spaced from each other and are arranged in a substantially circular formation extending about and closely spaced from said spool, a plurality of pins removably extended through said aligned disc openings and frictionally engaged with said disc portions so that said pins are arranged in a similar substantially circular formation about and closely spaced from said spool, said line extending first about said spool, then about said spool and one of said pins, then about said spool and said one pin and another one of said pins adjacent to said one pin proceeding in one direction around said circular formation, said line extending successively about one more pin as said line extends about said spool until finally said line extends about all of said pins, whereby as each pin in said formation is removed proceeding in a reverse direction around said formation the length of said line which can be unwound from said sinker on falling of the sinker from said float is increased.

References Cited by the Examiner
UNITED STATES PATENTS

| | | | |
|---|---|---|---|
| 1,058,939 | 4/1913 | Bean | 9—9 |
| 1,287,580 | 12/1918 | Dumaine | 9—9 |
| 1,331,819 | 2/1920 | Matheny | 242—128 |
| 1,588,798 | 6/1926 | Moore | 9—9 |
| 2,349,946 | 5/1944 | Durr | 242—77.1 |
| 2,716,758 | 9/1955 | Hajecate | 9—8 |
| 2,806,231 | 9/1957 | Hofmeister | 9—9 |
| 2,819,476 | 1/1958 | Dodge | 9—8 |

MILTON BUCHLER, *Primary Examiner.*

R. G. BESHA, T. MAJOR, *Assistant Examiners.*